United States Patent [19]

Valenyi et al.

[11] Patent Number: 4,690,777
[45] Date of Patent: Sep. 1, 1987

[54] PRODUCTION OF SYNTHESIS GAS

[75] Inventors: Louis J. Valenyi, Lyndhurst; Frederick A. Pesa, Aurora; Christos Paparizos, Willowick, all of Ohio

[73] Assignee: The Standard Oil Company, Cleveland, Ohio

[21] Appl. No.: 548,104

[22] Filed: Nov. 2, 1983

Related U.S. Application Data

[63] Continuation-in-part of Ser. No. 336,533, Jan. 4, 1982, abandoned.

[51] Int. Cl.$^4$ .............................. C01B 3/38; C01B 3/40
[52] U.S. Cl. ........................................................ 252/373
[58] Field of Search ......................................... 252/373

[56] References Cited

U.S. PATENT DOCUMENTS

| | | | |
|---|---|---|---|
| 1,984,380 | 12/1934 | Odell | 134/60 |
| 2,199,475 | 7/1937 | Wilcox | 23/212 |
| 2,220,849 | 11/1940 | Riblett | 252/373 |
| 2,522,468 | 9/1950 | Smith | 252/373 |
| 2,605,174 | 7/1952 | Krejci | 252/373 |
| 2,622,089 | 12/1952 | Mayland | 252/373 |
| 2,662,004 | 12/1953 | Gaucher | 252/373 |
| 2,676,156 | 4/1954 | Bailey | 252/373 |
| 3,132,010 | 5/1964 | Dwyer et al. | 252/373 |
| 3,451,949 | 6/1969 | Topsoe et al. | 252/373 |
| 3,617,227 | 11/1971 | Beggs | 252/373 |
| 3,849,087 | 11/1974 | Arakawa et al. | 252/373 |

Primary Examiner—Howard T. Mars
Attorney, Agent, or Firm—D. J. Untener; B. E. Harang; L. W. Evans

[57] ABSTRACT

Gas mixtures containing at least hydrogen and carbon monoxide are prepared by reforming hydrocarbons in the presence of a catalyst impregnated on a specially prepared porous catalyst support. In one embodiment of the present invention, methane is reformed in a process to produce a product gas mixture containing carbon monoxide and hydrogen in the presence of a catalyst comprising a porous catalytic support having a surface area greater than 1 to less than about 350 m$^2$/gm and a pore volume of about 0.4 to about 3 cc/gm and at least one Group VIII metal or mixture thereof on the pore surface of the support.

12 Claims, No Drawings

PRODUCTION OF SYNTHESIS GAS

This application is a continuation-in-part of application Ser. No. 336,533 filed Jan. 4, 1982 and now abandoned.

BACKGROUND OF THE INVENTION

1. Field of the Invention

This invention relates to a catalytic process for producing gas mixtures containing hydrogen and carbon monoxide by reforming light hydrocarbons. More particularly, the present invention provides a process for producing gas mixtures containing hydrogen and carbon monoxide by reforming methane in the presence of specially prepared reforming catalysts.

2. Description of the Art

Light hydrocarbon and, more particularly, methane reforming processes are well known. Generally, hydrocarbon oxidation of hydrocarbons using an oxygen containing gas as the oxidant. Typically, methane reforming processes produce gas mixtures containing carbon monoxide/hydrogen ratios of 1/3 according to the following chemical equation:

$$CH_4 + H_2O \quad 1\ CO + 3\ H_2 \qquad (I)$$
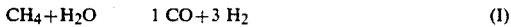

Since gas mixtures containing carbon monoxide/hydrogen ratios of 1/1 or 1/2 are particularly useful as feed gases in processes for producing higher hydrocarbons and oxygenated derivatives, such as Fischer-Tropsch and alcohol synthesis processes, a higher ratio of carbon monoxide/hydrogen is necessary. In order to increase the carbon monoxide content, a water gas shift reaction must be employed according to the following chemical equation:

$$CO_2 + H_2 \quad CO + H_2O \qquad (II)$$

Other processes for reforming hydrocarbons proceed by contacting the hydrocarbons with carbon dioxide, oxygen, steam or mixtures thereof. By varying the process conditions, methane reformation product gas mixtures could be obtained containing approximately a carbon monoxide/hydrogen ratio of between 2/1 to 1/1.

The reforming catalyst used in the above processes, generally Group VIII metals on various supports, have a tendency to liberate free carbon during the reforming process with the elemental carbon depositing on the catalyst. This deposition of carbon on the catalyst usually causes a significant decrease in the catalyst activity and, more importantly, often causes total disintegration of the catalyst. Thus, it would be highly desirable to catalytically reform light hydrocarbons at mild reaction conditions using a catalyst which is specifically suited to retain its activity during the reaction for long periods of time.

It is an object of the present invention to provide a catalytic process for reforming a light hydrocarbon and, more particularly, methane containing gases to obtain a product gas mixture containing hydrogen and carbon monoxide.

It is a further object of the present invention to provide a hydrocarbon reforming process which utilizes a specially prepared catalyst which is highly selective, highly resistant to carbon deposition, retains high activity even after deposition of carbon and allows for easy carbon removal without detrimental effect to the catalyst.

SUMMARY OF THE INVENTION

The present invention provides a process for reforming light hydrocarbons to a product gas mixture containing carbon monoxide and hydrogen comprising contacting the light hydrocarbon gas with carbon dioxide in the presence of a catalytic amount of a catalyst comprising a porous catalyst support having a surface area of greater than 1 to less than about 350 m²/gm and a pore volume of about 0.4 to about 3 cc/gm and at least one Group VIII metal or mixture thereof on the pore surfaces of the support.

DETAILED DESCRIPTION OF THE INVENTION

The process of the present invention employs a one-step catalytic reaction according to the chemical equation:

$$CH_4 + CO_2 \quad 2\ CO + 2H_2 \qquad (III)$$

The temperature and pressure of the process can vary widely. Typically, the temperature ranges from about 350° C. to about 850° C., preferably from about 500° C. to about 750° C. Although subatmospheric, atmospheric or superatmospheric pressures can be employed, low pressures, from about 1 atmosphere to about 10 atmospheres are preferred. Most preferred are pressures which range from about 1 to about 2 atmospheres since this process can be conducted in the absence of steam.

The ratio of methane to carbon dioxide in the feed gas effects the ratio of carbon monoxide to hydrogen in the product gas mixtures and thus may be varied to obtain the CO/H₂ ratio desired. It has been found that higher concentrations of carbon dioxide than methane in the reactant gas mixture will result in a product gas mixture containing about equal amounts of carbon monoxide and hydrogen which is generally a desirable feed ratio for Fisher-Tropsch type reactions. Typically, the feed gas molar ratios of carbon dioxide to hydrocarbon can range from about 0.75 to about 1.8, preferably from about 1.0 to about 1.4 and, most preferably, from about 1.1 to about 1.3.

In a separate embodiment, steam can be used in combination with carbon dioxide to increase the ratio of carbon monoxide to hydrogen in the product gas. In this case, steam can replace up to 75 percent of the carbon dioxide in the above feed ratios. By replacing some of the carbon dioxide with steam, the carbon monoxide/hydrogen ratio will vary from 1/1 to about 1/2 which is a desirable feed ratio for alcohol synthesis reactions.

Although the invention particularly aims at reforming methane, any light hydrocarbon can be employed in the process of the present invention at the process conditions used herein for methane. For example, paraffins or olefins having from 1 to about 4 carbon atoms, such as ethane, propane, butane, ethene, propene and butene, can be employed in this process, although product mixtures will change depending upon the process conditions and feed gas employed. However, methane, the major constituent in natural gas, is preferred because of its abundance and low cost. Any gas containing at least about 60 percent methane can be employed as the light hydrocarbon feed gas. Preferably, the light hydrocarbon gas will containing at least 80 percent and, most preferably, 90 percent methane.

The reforming catalysts used in the process of the present invention have a relatively specific particle size distribution and density which make the catalysts highly resistant to activity attention and desirable for use in a fluid-bed operation. The reforming catalyst is composed of a porous fluid-bed support material having a specific combination of properties which is impregnated with a Group VIII metal in such a manner that the metal is present on the inside surfaces of the particle support or, more particularly, on the pore surfaces.

Particles composed of a porous particulate material such as silica impregnated with Group VIII metals are well known. However, the nature of the pores must be precisely selected to exhibit a precise combination of properties in order that the inventive reforming catalyst will exhibit the necessary properties desired.

Porous, particulate, free-flowing catalyst support materials for use in making fluid-bed catalysts are well known. Examples of such materials are silica, alumina, silica/alumina, zirconia, titania, hafnia, silicon carbide, boron phosphate, diamtomaceous earth, pumice and the like.

In accordance with the invention, any such support material can be employed to make the inventive reforming catalyst, providing that such support material has a surface area of about 0.4 to about 3 cc/gm. Preferred are those supports having a surface area of about 6 to about 250 m$^2$/gm and pore volumes of about 1 to about 2 cc/gm. Most preferred are supports having a surface area of about 30 to about 80 m$^2$/gm and a pore volume of about 1 to about 2 cc/gm. Silica has been found to be a preferred support material.

Especially preferred support materials are those as described above which are further characterized in containing no measurable pores having pore diameters of less than about 50 Angstroms, preferably less than 80 Angstroms, most preferably less than about 100 Angstroms when measured by the mercury porousimeter technique.

Although not intending to be bound by theory, it is believed that the importance of the above surface area and pore volume restrictions relates to the stability and integrity of the catalyst particles. High carbon deposition on the catalyst has been a continuing problem in hydrocarbon reforming processes. This carbon deposition covers the catalytic metals and results in low activity and eventual disintegration of the catalyst particle. However, the present invention alleviates this problem by requiring specific surface areas and pore volumes in the catalyst support material. For example, if carbon were allowed to grow in extremely small pores in the support particles, it would soon fill up those pores causing a decrease in activity in the catalyst. Continued growing of the carbon would additionally cause high stresses to be exerted on the particle skeleton which would ultimately lead to fracturing of the particles and catalyst disintegration. Thus, by eliminating the very small pores, the tendency of the particles to break up because of the high expansive stresses developed when the carbon material outgrows the growing space is eliminated.

Further, the large pore size results in high intersurface area which allows for an overall high catalyst to reactant contact area. By coating the intersurface area with the metal catalyst, there is a lower possibility of having significant amounts of the catalyst covered by elemental carbon. As an additional benefit of the present invention, it appears that the inventive reforming catalyst accepts a decreased amount of carbon deposition. This may be due to the decreased exterior surface area available for carbon deposition and the constraints of formation within the pores.

Particulate support materials having the combination of properties set forth above can be prepared from commercially available porous support materials. In order to reduce the surface area of the support starting material, presumably for the elimination of extremely small pores, various techniques can be employed. Many techniques are known which will reduce surface area and otherwise adjust the pore structure of fluid-bed support materials, and any such technique can be employed in connection with suitable starting materials. For example, it is known that impregnation of a high surface area support material such as silica or a umina with ammonium heptamolybdate will, once the support is calcined in air or other atmospheres, significantly reduce the surface area of the support material. Impregnation of silica with phosphoric acid followed by calcination in air is also known to significantly reduce the surface area of porous silica.

A preferred method of reducing surface area of the support is by hydrothermal treatment. The support material is contacted with liquid water at a temperature of between about 100° and about 300° C., preferably from about 120° to 220° C., at pressures which maintain the water in the liquid state for a sufficient time to eliminate the extremely small pores, such as 10 to 100 minutes.

As a particular advantage of the catalyst of the present invention, the catalyst can be employed in fluid-bed reactions. To those skilled in the art of fluid-bed reactions, it is well known that a solid which is to be fluidized must have an appropriate particle size distribution and density. Since the vast majority of the Group VIII metal will be incorporated into the support interior, the particle size distribution of the support will be similar or essentially the same as the particle size distribution of the inventive reforming catalyst itself. Therefore, the support must exhibit a particle size distribution appropriate for use as a fluid-bed material. Normally, this means that at least 80 percent of the particulate support will have a particle size distribution ranging between 5 to 300, preferably 10 to 200, most preferably 20 to 150 microns.

Any Group VIII metal or a mixture thereof can be employed as the coating or impregnate. Although any Group VIII metals can be utilized such as iron, cobalt, nickel, palladium, platinum, etc., iron, cobalt, and nickel are preferred, while nickel is especially preferred.

The amount of the Group VIII metal in the support can vary widely. For convenience, the amount of Group VIII metal can be set forth in terms of single layers of the Group VIII metal based on the measured surface area of the support to be impregnated. In other words, based on the surface area of the support to be impregnated and the atomic radius of the Group VIII metal to be deposited on the pore surfaces of the support, the total number of atoms and hence the total number of moles of Group VIII metal needed to completely coat all of the surfaces of the particles with a single layer of the Group VIII metal one atom thick can be calculated. For continued convenience, the amount of Group VIII metal impregnated into the support can be referred to in terms of multiples or fractions of such layers.

It has been found that the amount of Group VIII metal impregnated into the support particles should be at least about one layer. As the metal loading increases above one layer, the performance of the catalyst increases rapidly with catalysts having a metal loading corresponding to about two layers exhibiting excellent activity. Although theoretically there is no maximum to the amount of metal loadings, too much metal will fill the pores of the support reducing the pores overall capacity to accept carbon and increasing the catalyst tendency to deactivate and/or disintegrate. Metal loadings on the order of about 1.5 to about 3.0 are preferred with metal loadings on the order of about 2 layers being especially preferred.

Additionally, it should be appreciated that it is desirable to have catalyst particles having low external surface areas. Although the overall surface area should be relatively high, the amount of surface area attributable to the external surfaces of the particles should be essentially negligible. This ensures high amounts of the Group VIII metal depositing on the surface of the pores in the body of the support particles rather than on the external surface of the particle.

The Group VIII metal can be deposited into the pores of the pore support by any of the well known techniques for accomplishing such impregnations. Typically, this is accomplished by impregnating the porous support material with a liquid containing the Group VIII metal or a compound thereof in solution, drying and, if necessary, heat treating in an appropriate atmosphere or series of atmospheres so as to provide the metal in elemental form. For example, organic compounds, such as iron carbonyl, dissolved in a suitable organic solvent, such as n-pentane, could be employed as the impregnating solution. Further, organic salts of Group VIII metals dissolved in organic solutions (e.g. methanol) could be used as impregnating solutions.

One of the important advantages to using reforming catalysts prepared according to the above techiques, is the resistance of these catalysts to carbon deposition. Surprisingly, it has been found that the catalyst does not exhibit a significantly decreased activity or selectivity when small amounts of carbon are deposited on the catalyst. Further, when carbon does deposit on the catalyst, it can be removed without detrimental affect. For example, the carbon can be removed simply by contacting the catalyst with steam or hydrogen without inactivating the catalyst.

SPECIFIC EMBODIMENTS

EXAMPLE 1

Catalyst Preparation

The support material was first processed according to the following procedure. Commercially available $SiO_2$ (80.0 gms) was mixed in an autoclave with a solution of 0.56 gms of $K_2CO_3$ and 200 ml of distilled water. The autoclave was brought to 230° C. and maintained at that temperature for 30 minutes at 400 psig. After 30 minutes, the autoclave was rapidly cooled by flushing water through a loop within the autoclave and bringing the pressure down to atmospheric within 2 minutes. The silica was then removed from the reactor, washed three times with 100 ml aliquots of distilled water and then dried overnight in air at 110° C.

A nickel solution was prepared by dissolving 47.55 gms of $Ni(NO_{03})_2 \cdot 6 H_2O$ a minimum amount of water, approximately 20 cc. This solution was added dropwise with stirring to 54.15 gms of the hydrothermally treated silica described above. The addition was done gradually and with enough stirring to maintain a homogeneous appearance of the catalyst. The impregnated catalyst was dried overnight at 110° C. in air. The catalyst was then calcined in air at 150° C. for 30 minutes and further at 400° C. for an additional 6 hours. Next, the catalyst was placed in a 25 mm inside diameter quartz fluid-bed reactor. The catalyst was contacted with hydrogen at 129 cc/min at 550° C. for 90 minutes. After 90 minutes, the temperature was raised to 650° C. for 30 minutes. The catalyst was then cooled in an atmosphere of nitrogen and removed from the reactor once reaching room temperature. At room temperature, the catalyst was stable to atmospheric oxygen. The catalyst contained about 15 percent nickel by weight.

EXAMPLES 2-4, AND A-C

Several catalysts exhibiting varying physical characteristics were prepared for comparison. Examples 2-4 were prepared using the procedure of Example 1. The procedure of Example 1 was modified to produce the catalysts of Examples A and B exhibiting characteristics outside the range claimed herein. Example C is a commercial reforming catalyst having about 15.5 percent nickel by weight supported on silica available from United Catalyst, Inc. The surface areas and pore volumes of the above catalysts are shown in Table I.

TABLE I

| | SURFACE AREA AND PORE VOLUME | |
|---|---|---|
| CATALYST | SURFACE AREA ($m^2$/gm) | PORE VOLUME (cc/gm) |
| 1 | 34 | 1.0 |
| 2 | 310 | 0.89 |
| 3 | 37 | 0.58 |
| 4 | 34 | 2.15 |
| A | 366 | 0.26 |
| B | 31 | 3.15 |
| C | 124 | 0.15 |

TABLE II

| | METHANE REFORMING AT 600° C.* | | | |
|---|---|---|---|---|
| CATALYST (EXAMPLE) | PERCENT $CH_4$ CONVERSION | PERCENT SELECTIVITY TO $CO/H_2$ | GMS. CARBON ON CATALYST | REMARKS |
| 1 | 44.91 | 77.8 | 0.34** | No metal separation, no cracks in support |
| 2 | 45.7 | 79.5 | 0.33 | No metal separation, no cracks in support |
| 3 | 44.9 | 78.8 | 0.29 | No metal separation, no cracks in support |
| 4 | 49.5 | 81.8 | 0.28 | No metal separation, no cracks in support |
| A | 38.4 | 62.2 | 0.65 | Metal separation, cracks in support |
| B | 33.3 | 66.7 | 0.89 | Metal separation, cracks in support |
| C | 34.5 | 63.6 | 1.20** | Metal separation, cracks |

TABLE II-continued

METHANE REFORMING AT 600° C.*

| CATALYST (EXAMPLE) | PERCENT $CH_4$ CONVERSION | PERCENT SELECTIVITY TO $CO/H_2$ | GMS. CARBON ON CATALYST | REMARKS |
|---|---|---|---|---|
| | | | | in support |

TABLE III

METHANE REFORMING AT 725° C.*

| CATALYST (EXAMPLE) | PERCENT $CH_4$ CONVERSION | PERCENT SELECTIVITY TO $CO/H_2$ | GMS. CARBON ON CATALYST | REMARKS |
|---|---|---|---|---|
| 1 | 91.1 | 97.2 | 0.10** | No metal separation, no cracks in support |
| 2 | 92.3 | 96.8 | 0.17 | No metal separation, no cracks in support |
| 3 | 90.9 | 96.1 | 0.19 | No metal separation, no cracks in support |
| 4 | 92.6 | 96.5 | 0.16 | No metal separation, no cracks in support |
| A | 70.3 | 88.0 | 0.53 | Metal separation, cracks in support |
| B | 75.8 | 87.9 | 0.62 | Metal separation, cracks in support |
| C | 70.5 | 87.2 | 0.90** | Metal separation, cracks in support |

*All runs were conducted for 30 minutes except examples 1 and C which were run for 15 minutes.
**The actual value was doubled (since these runs were for 15 minutes) to obtain comparative numbers for 30 minutes.

Examples 1-4 in the above Tables I-III illustrate the present process while Examples A-C are supplied for comparative purposes. As shown in Table I, the catalysts of Examples 1-4 have surface areas and pore volumes within the ranges of the catalyst used in the inventive process while the catalysts of Examples A-C are provided for comparison and are outside the claimed ranges. Tables II and III illustrate the higher conversions and selectivities exhibited by Examples 1-4 as compared to Examples A-C at 600 and 725° C., respectively. Moreover, the catalysts of Examples 1-4 surprisingly exhibit a much higher resistance to carbon deposition and catalyst degradation than Examples A-C.

The catalysts of Examples 1-4 and A-C were examined by a scanning electron microscope after the runs of Table II and III. The catalysts of Examples A-C exhibited metal separation from the support in the form of metal fibers and exhibited cracks in the physical structure of the support. On the other hand, the catalysts of Examples 1-4 did not exhibit any metal separation or cracks.

Thus, it should be apparent to those skilled in the art that the subject invention accomplishes the objects set forth above. It is to be understood that the subject invention is not to be limited by the examples set forth herein. These have been provided merely to demonstrate operability while the selection of catalyst formulations, synthesis gas component ratios and reaction conditions can be determined from the total specification disclosure provided without departing from the spirit of the invention herein disclosed and described. The scope of the invention includes equivalent embodiments, modifications and variations that fall within the scope of the attached claims.

We claim:

1. A process for reforming light hydrocarbons selected from the group consisting of olefins having from 2 to about 4 carbon atoms and paraffins having from 1 to about 4 carbon atoms, to a product gas mixture containing at least carbon monoxide and hydrogen comprising contacting the light hydrocarbons with carbon dioxide in the presence of a catalytic amount of a catalyst comprising a porous catalyst support having a surface area greater than 1 to less than about 350 m²/gm and a pore volume of about 0.4 to about 3 cc/gm and at least one Group VIII metal or mixture thereof on a pore surface of the support in the absence of steam.

2. The process of claim 1 wherein the light hydrocarbon is methane.

3. The process of claim 2 wherein the surface area of the catalyst support is from 6 to about 250 m²/gm and the pore volume is from about 1 to about 2 cc/gm.

4. The process of claim 2 wherein the catalyst support exhibits no measurable pores having a pore diameter of less than about 50 Angstroms.

5. The process of claim 2 wherein the catalyst support is silica.

6. The process of claim 2 wherein the Group VIII metal is selected from the group consisting of iron, cobalt or nickel.

7. The process of claim 2 wherein the Group VIII metal is nickel.

8. The process of claim 2 wherein the temperature is from about 350° C. to about 850° C.

9. The process of claim 2 wherein the pressure is from about 1 to about 2 atmospheres.

10. The process of claim 2 wherein the Group VIII metal is present on the pore surface of the support in an amount of about 1.5 to about 3 layers.

11. The process of claim 1 wherein at least 80 percent of the catalyst support has a particle size distribution ranging between 5 to 300 microns.

12. The process of claim 11 wherein at least 80 percent of the catalyst support has a particle size distribution ranging between 20 to 150 microns.

* * * * *

UNITED STATES PATENT AND TRADEMARK OFFICE
CERTIFICATE OF CORRECTION

PATENT NO. : 4,690,777
DATED : September 1, 1987
INVENTOR(S) : Velenyi et al

It is certified that error appears in the above—identified patent and that said Letters Patent is hereby corrected as shown below: Item [19] and [75]:

On the Title page change the first named inventor from "Valenyi" to --Velenyi--

Signed and Sealed this

Twelfth Day of January, 1988

Attest:

DONALD J. QUIGG

*Attesting Officer*  *Commissioner of Patents and Trademarks*